UNITED STATES PATENT OFFICE.

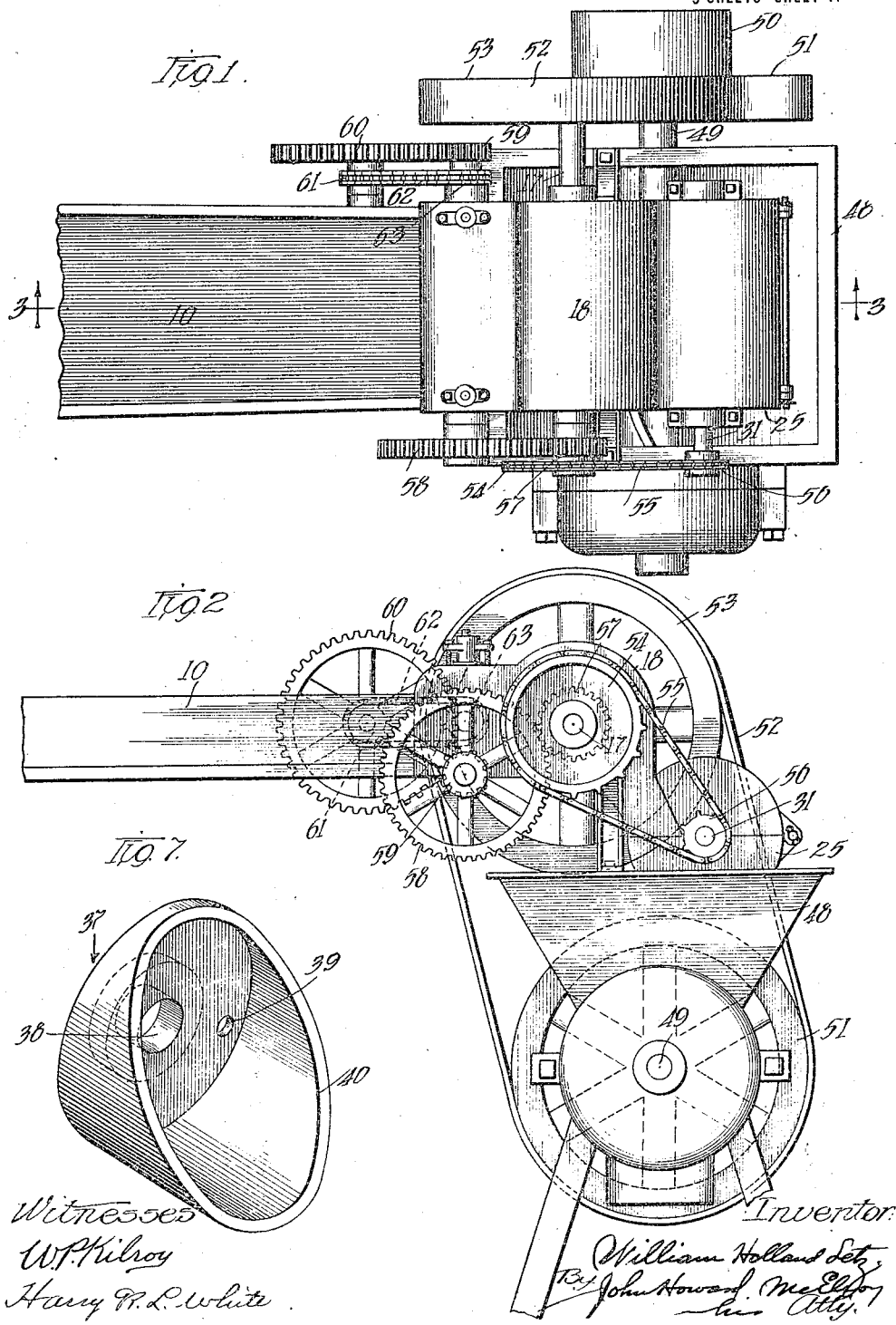

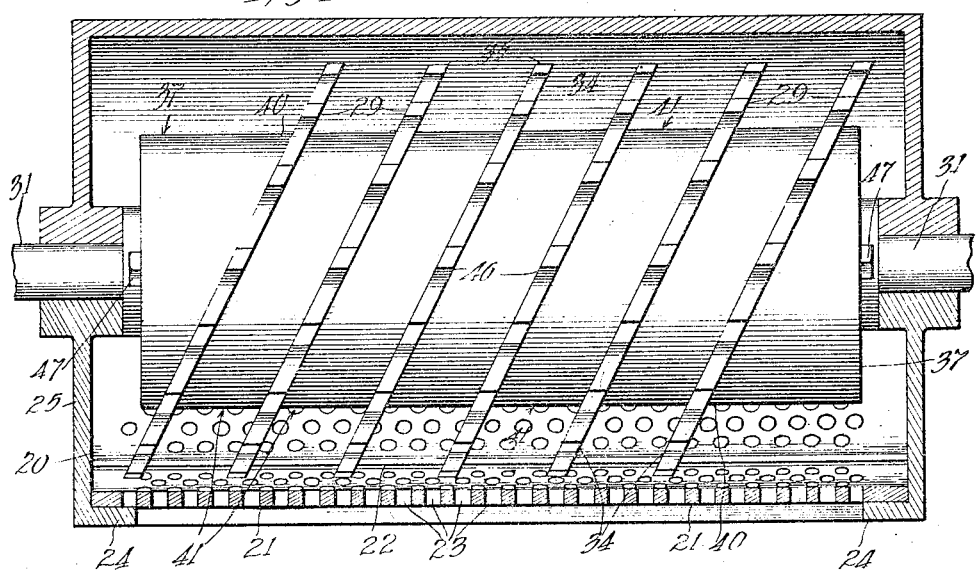
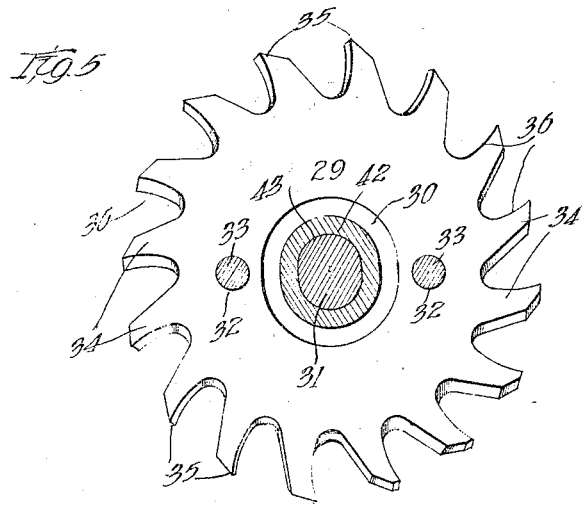
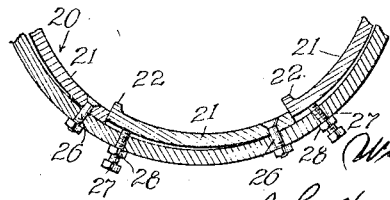

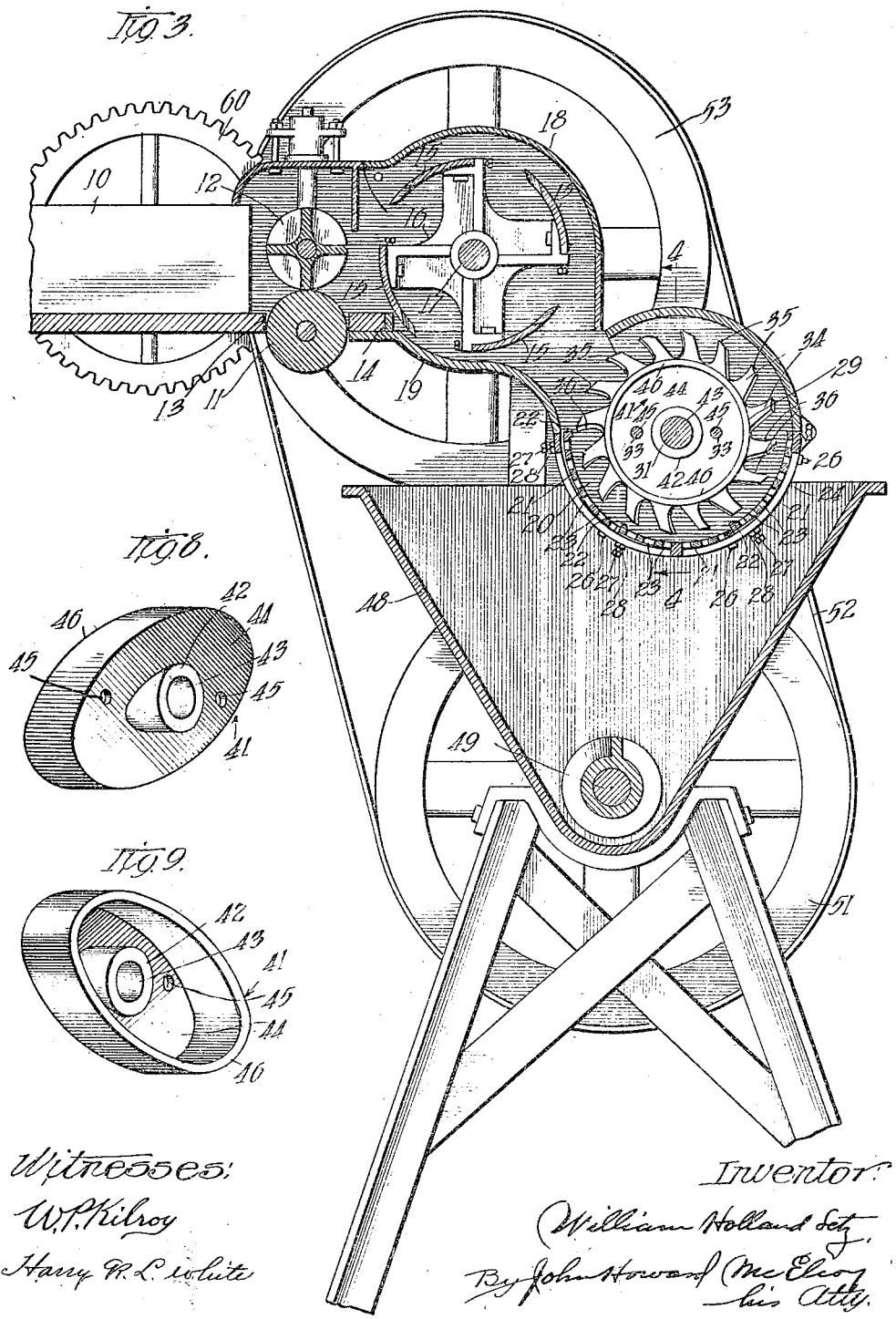

WILLIAM HOLLAND LETZ, OF CROWN POINT, INDIANA, ASSIGNOR TO THE LETZ MANUFACTURING COMPANY, OF CROWN POINT, INDIANA, A CORPORATION OF INDIANA.

HAY-CUTTER.

1,281,598.

Specification of Letters Patent.   Patented Oct. 15, 1918.

Application filed January 31, 1916. Serial No. 75,213.

*To all whom it may concern:*

Be it known that I, WILLIAM HOLLAND LETZ, a citizen of the United States, and a resident of Crown Point, in the county of Lake and State of Indiana, have invented certain new and useful Improvements in Hay-Cutters, of which the following is a full, clear, and exact specification.

My invention is concerned with hay cutters used in the grinding of alfalfa and clover hay, and is designed to produce a device of the class described in which the hay will surely be cut into pieces of not less than the predetermined length prior to its being delivered to the grinder proper, thus insuring that the latter will grind all the hay properly and at a maximum rate.

To illustrate my invention, I annex hereto three sheets of drawings, in which the same reference characters are used to designate identical parts in all the figures, of which,—

Figure 1 is a plan view of the complete device;

Fig. 2 is a side elevation;

Fig. 3 is a central vertical section on the line 3—3 of Fig. 1, but on an enlarged scale;

Fig. 4 is a section on the line 4—4 of Fig. 3, but on a still larger scale;

Fig. 5 is a plan view of one of the elliptical toothed plates or saws;

Fig. 6 is an enlarged detail of Fig. 4, showing how the perforated cutting concaves are adjusted to and from the cutting head;

Fig. 7 is a perspective view of one of the end castings for holding the elliptical cutting plates in place; and Figs. 8 and 9 are similar views on opposite sides of one of the intermediate castings for holding said plates spaced apart.

The various elements going to make up the complete machine are mounted upon suitable framework which need not be described. There is a feed trough 10, upon which the hay is placed and from which it is shoved between the upper and lower feed-rolls 11 and 12, which are secured on suitable shafts suitably journaled in bearings in the customary manner as such rolls are mounted. The lower feed-roll 11 is mounted, as seen, in a suitable aperture 13 in the bottom of the feed trough, and the hay is fed from the trough over the cutter bar 14 secured to the end of the trough, and into the path of the helical blades 15 secured at their ends on spiders 16 secured toward the ends of the shafts 17, journaled in suitable bearings in the casing 18. A portion of the bottom 19 of the casing leads the hay cut into short pieces by the cutter I have just described, to the perforated concave 20.

This concave 20, as best seen in Figs. 3, 4 and 6, is preferably made up of three plates 21, each curved on the arc of a circle and having at its forward side a cutting edge 22 ground for cutting purposes so as to be in immediate proximity to the path of the teeth of the cutter-head to be described. Between this edge and the other side of the plate it is provided with numerous perforations 23, of a size which will depend on the length of the particles of hay that are to be delivered to the grinder. For example, these perforations may be a quarter of an inch in diameter, in which case the plates as seen in Fig. 4 are substantially a quarter of an inch thick, forming a heavy cutting concave, and, as will be noted, the perforations extend radially of the curvature of the plate so as to present what are in effect square cutting edges to coöperate with the teeth of the cutting head, although these edges are not so close to the path of the cutting teeth as are the edges 22. It will be obvious that these perforations might be inclined somewhat so as to present sharper angles than ninety degrees to the approaching cutting edges of the teeth of the cutter-head. To regulate the fineness to which the hay is cut by this portion of the apparatus, I preferably arrange to adjust the concave plates 21 by the means shown in Fig. 6, where it will be seen that the plates at their ends overhang the flanges 24 projecting inwardly from the bottom of the casing 25 in which the cutter-head is journaled. Through holes in the rear of the plates 21, near their ends, and through registering holes in the flanges 24, I pass the bolts 26, and through threaded apertures in the flanges 24 near the cutting edges 22, I pass set screws 27, which are provided with lock nuts 28, so that by turning the screws 27 in and out, the distance of the concave from the teeth of the cutting-head may be regulated. If it is desired to bring the entire concave closer, instead of just the forward edges, some sort of a spacing strip may be placed between the ends of the plates 21 and the flanges 24 before they are secured by the bolts 26, which bolts will of course be loosened when the adjustment by the manipulation of the screws 27 is made.

The cutter-head is made up of a plurality of elliptical plates 29, which are preferably castings, one of which is seen in Fig. 5. These castings have the central aperture 30 to accommodate the shaft 31 passing through all of them, and the two small apertures 32 to accommodate the clamping rods 33 passed therethrough. They have teeth 34, which are of the shape shown, and which have the peripheral cutting-edges 35 and the radial cutting-edges 36, these cutting edges being sharpened before the head is assembled, and the edges 35 being designed to coöperate directly with the edges 22 and the cutting edges formed by the tops of the perforations 23. The cutting plates 29 are, as seen in Fig. 5, generally elliptical in their outline, and, as best seen in Fig. 4, they are set at the proper angle to the shaft 31 so that the general outline of the vertical cross-sections through the cutter-head at right angles to the shaft 31 will be circular so that the cutting edges 35, especially, of the teeth 34, will coöperate with the semicircular concave formed by the plates 21. To hold these plates on the shaft at the proper angle, I employ at each end the end casting 37, best seen in Fig. 7, which has the central aperture 38 for the shaft 31; the apertures 39 for the rods 33, and the flange 40, which of course is cut off at the same angle as that at which the plates 29 stand. Between the adjacent plates 29 are the intermediate castings 41, best seen in Figs. 8 and 9, which have the hub 42 with the aperture 43 for the shaft 31, and the web 44 set on the hub at the same angle as the plates 29 are set relative to the shaft 31. The web 44 has the apertures 45 for the rods 33, and at the periphery of the web 44 is the flange 46, which is the actual spacing member separating the adjacent plates 29. When these end pieces 37, plates 29 and intermediate castings 41 are threaded on the shaft 31, and the rods 33 passed through the appropriate apertures and secured by the nuts 47 at the ends thereof, it will be seen that a substantial cutter-head is built up in which the teeth 35 will, by the inclination given to the plates 29, in effect not only rotate across the concave, but will pass longitudinally thereof, so that the cutting edges 35 of some of the teeth 34 will necessarily coöperate with each and every one of the appertures 23.

The hay which is thus additionally cut up passes through the apertures 23 and falls into the hopper 48, at the bottom of which is the customary shaft 49 for a grinding machine of any suitable type, such, for instance, as that shown in the Letz Patent No. 1,077,714, dated November 4, 1913, the burs of which finally acting on the cut hay will grind it to any desired fineness.

The gearing for driving the elements so far described may be as follows:

The grinder shaft 49 is provided on one end with the driving pulley 50, and adjacent said driving pulley is the belt wheel 51, which through the belt 52 drives the large belt-wheel 53 secured on the outer end of the shaft 17. The other end of the shaft 17 is provided with the large sprocket-wheel 54, which, through the sprocket chain 55 coöperating with the sprocket pinion 56 on the end of the shaft 31, serves to drive the cutter head at a relatively high speed. A spur gear pinion 57, also secured on the same end of the shaft 17, meshes with the large spur gear wheel 58 secured on the shaft of the lower feed-roller 11, and as I desire to drive the upper feed-roller 12 at a higher rate of speed to insure all of the hay being delivered, I secure on the other end of the shaft of the lower feed-roller 11 a spur gear pinion 59 which meshes with a large spur gear wheel 60 journaled on a stub shaft and having the sprocket pinion 61 secured on its hub. A sprocket chain 62 passing over the pinion 61 and a similar pinion 63 on the adjacent end of the shaft of the upper feed-roll 12 causes the upper feed-roll to be driven from the lower feed-roll at a reduced rate of speed and without any difficulty resulting from the rising and falling of the upper feed-roller due to the varying quantity of hay that may be passed between the feed rollers. The bearings of the upper feed-roller are of course provided with the customary springs to press it down upon the lower feed-roller.

The action of the complete apparatus is as follows:

Power being applied from any suitable source to the drive wheel 50, the various rotating elements will be driven at relative speeds indicated by the proportions of the described gearing. The hay to be cut is thrown in the trough 10 and fed to the rollers 11 and 12, which pass the hay at a certain definite speed to the rotating helical knives 15, which, if the hay were straight and all fed at right angles to the axes of the feed rollers, would cut it into pieces of a uniform length, say, for instance, one-half an inch. Owing to the fact that the hay is not straight and cannot be fed between the feed rollers at right angles to their axes, much of the hay is cut into very much longer lengths than is intended, and all the hay thus cut into pieces of varying length is passed from the knife-head down over the portion 19 of the casing and into the perforated concave, where the shortest pieces will pass through the perforations without the necessity of further cutting, by reason of the downward sweep given to it by the teeth of the cutter head. Such pieces as are longer than they should be will have their advancing ends forced into the perforations 23, while their other ends project out of said perforations until the teeth 34 registering with the particular perforations pass, at which time the cutting edges 35 will shear the portions of the hay projecting above the concave off and carry them on to other perforations, into which they are forced, and so on, until they are cut to the proper length to pass through the perforated concave into the hopper 48. By this mechanism all the hay that is delivered from the hopper 48 is necessarily cut down to the proper length, and can be readily fed by the screw in the hopper to the burs of the grinder, where the hay will be ground to the desired fineness.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with feed rolls, of a knife-head rotating in proximity thereto to cut the hay fed thereto by the rollers, a heavy cutting concave having perforations therethrough of substantially the same dimensions in all three directions, a rotary cutter-head centrally mounted in the concave composed of parallel saws set slanting on the shaft and having the cutting edges of their teeth as wide as the perforations and coöperating with the farther edges thereof, and means for rotating the feed rollers, knife-head and cutter-head in synchronism.

2. In a device of the class described, the combination with a heavy cutting concave having perforations therethrough of substantially the same dimensions in all three directions, of a rotary cutter-head centrally mounted in the concave composed of parallel saws set slanting on the shaft and having the cutting edges of their teeth as wide as the perforations and coöperating with the farther edges thereof, and means for rotating said cutter-head.

3. In a device of the class described, the combination with a perforated concave, consisting of a plurality of curved castings set upon a supporting frame to form a semi-circular concave having the raised cutting edges for their forward sides, and having the inner edges of the perforations shaped so that they may act as shearing or cutting edges, of a rotating cutter-head centrally journaled therein and having teeth coöperating with the raised cutting edges and the cutting edges formed by the perforations, and means for rotating said cutter-head.

In witness whereof, I have hereunto set my hand and affixed my seal this 4th day of January, A. D. 1915.

WILLIAM HOLLAND LETZ. [L. S.]

Witnesses:
R. B. BRADFORD,
A. A. BREMER.

Copies of this patent may be obtained for five cents each, by addressing the "Commissioner of Patents, Washington, D. C."